United States Patent [19]

Tarr

[11] Patent Number: 5,221,329
[45] Date of Patent: Jun. 22, 1993

[54] WATER REPELLENT COMPOSITION

[75] Inventor: Larry E. Tarr, Seattle, Wash.

[73] Assignee: The Boeing Company, Seattle, Wash.

[21] Appl. No.: 870,974

[22] Filed: Apr. 20, 1992

[51] Int. Cl.$^5$ .............................................. B09K 3/18
[52] U.S. Cl. ........................................... 106/2; 106/13;
106/287.14; 106/287.16
[58] Field of Search ............ 106/2, 13, 287.14, 287.16

[56] References Cited

U.S. PATENT DOCUMENTS

| 27,601 | 3/1873 | Fain et al. | 260/25 |
|---|---|---|---|
| 3,231,196 | 1/1966 | Gunnar et al. | 239/70 |
| 3,244,541 | 4/1966 | Fain et al. | 106/13 |
| 3,310,429 | 3/1967 | Gunnar et al. | 117/124 |
| 3,352,709 | 11/1967 | Gunnar et al. | 117/124 |
| 3,766,123 | 10/1973 | Burnie et al. | 260/32.4 |
| 3,772,346 | 11/1973 | Hess | 260/448.8 |
| 3,966,902 | 6/1976 | Chromecek | 424/59 |
| 4,735,626 | 4/1988 | Smith et al. | 8/137 |
| 4,927,668 | 5/1990 | Senckowski | 427/168 |
| 4,948,047 | 8/1990 | Zembrodt | 239/34 |
| 5,041,421 | 8/1991 | King | 512/4 |
| 5,047,234 | 9/1994 | Dickerson et al. | 424/76.2 |

Primary Examiner—Mark L. Bell
Assistant Examiner—Margaret Einsmann
Attorney, Agent, or Firm—Robert H. Sproule

[57] ABSTRACT

Water Repellent compositions including a silico-titanium polymer, a cationic, surface-active quaternary ammonium compound, and a spreading agent which provides odor detection properties.

4 Claims, No Drawings

WATER REPELLENT COMPOSITION

TECHNICAL FIELD

The present invention relates to a composition for repelling water from a transparent solid.

BACKGROUND OF THE INVENTION

It is desirable to maintain clear vision through windshields during the presence of rain or water spray. In fast moving vehicles, such as aircraft, mechanical wipers are not totally effective in removing rain or water spray which impact the windshields in large volumes and at rapid speeds.

There are numerous conventional rain repellent compositions for airplane windshields. These compositions are stored in pressurized canisters located in or near the airplane cockpit. The repellent composition is carried by pressurized tubes to spray nozzles located adjacent to and below the exterior surfaces of the airplane windshields where the repellent is applied to the windshield.

Some of the conventional rain repellent compositions include a highly volatile solvent, such as trifluorotrichloroethane (also known as Freon, a trademark of Du Pont de Nemours, E.I. & Co.) and a hydrophobic polymer. Freon is often used because it has excellent solvent qualities, is nonflammable, has low toxicity, and it rapidly evaporates when applied to a windshield.

When the rain repellent composition is applied to a windshield, the windstream causes the solvent/polymer to be dispersed across the windshield. It is desirable that the hydrophobic polymer be spread across the windshield as a thin film which is hydrophobic in nature. In this manner the rain droplets, instead of adhering to the windshield, bead up, and are blown off the windshield by the airstream. Freon, once applied to the windshield, flashes off quickly leaving only the polymer film. However, the high volatility of the Freon solvent can also be a disadvantage. For example, in conditions of no rain or very light rain, the Freon may flash off before the polymer has had an opportunity to be dispersed across the windshield. This not only leaves a portion of the windshield without rain repellent, but the portion of the windshield having the rain repellent may not be optically clear due to the large amount of rain repellent present there. This is sometimes referred to as the "dry smear" problem.

There have been a number of conventional compositions and methods for rendering optical surfaces, such as aircraft windshields, repellent to water. For example, in U.S. Pat. No. 3,433,750 by Fain et al, the contents of which are incorporated by reference herein, there is disclosed a rain repellent compound including a cationic, surface-active quaternary ammonium component and a silico-titanium copolymer component. Furthermore, in U.S. Pat. No. 3,766,123 by Burnie et al there is disclosed a rain repellent compound including a copolymer of the silicotitanium type, silicosilicon type or silicozirconium type, a spreading component, and a solvent component. In addition, U.S. Pat. No. 2,512,058, the contents of which are incorporated herein by reference, discloses a method of forming silico-titanium copolymers.

In addition to the problems caused by "dry smear", many of these conventional rain repellents are odorless and are difficult to detect in the event of a leak in the repellent container or distribution line which carries the repellent to the spray applicator.

SUMMARY OF THE INVENTION

The present invention pertains to water repellent compositions containing a silico-titanium copolymer, a cationic, surface-active quaternary ammonium compound, and a spreading agent which provides odor detection properties.

It is an object of the present invention to provide a rain repellent composition which acts as a solvent to distribute the repellent over the windshield. In addition to this property, it is an object of the present invention to provide a rain repellent composition which:

a) is optically clear so as not to interfere with the ability to see through the windshield;

b) has a refractive index which is close to the refractive index of the windshield. More specifically, even if the repellent film is smooth and optically clear, a repellent having a different refractive index than the windshield can cause objects to appear in a location different than they actually are;

c) has good mobile qualities so that it spreads quickly across the windshield once it is applied. In this manner, the windshield is covered by the repellent and it forms a smooth thin film to minimize visual distortion;

d) is soluble in the solvent;

e) has good low temperature qualities so that when applied in cold weather or to a cold windshield, the liquid repellent remains mobile and spreads across the windshield;

f) has sufficient surface tension such that it will wet an untreated windshield, but not wet a previously treated windshield. More specifically, as the carrier, such as Freon, flashes off and the concentration of the other polymer increases, the repellant should blow away if the windshield has previously been treated, but continue to spread across the windshield if the windshield has not been treated;

g) is non-toxic, complies with environmental regulations and does not adversely affect any of the vehicle or airplane parts with which it may come in contact with, e.g., aircraft paint, windshields, sealants, etc.; and h) is nonflammable so as not to create a fire hazard.

DETAILED DESCRIPTION

In the present invention there is provided a water repellent compound which includes a silico-titanium copolymer, a cationic, surface-active quaternary ammonium compound, and an additive for providing improved spreading and odor detection properties. The silico-titanium copolymer is formed by reacting the hydrolysis product of a silane selected from the group consisting of a dialiphatic dialkoxy silane having the formula:

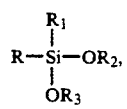

and a dialiphatic dihalo silane having the formula:

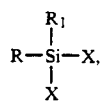

and a monoaliphatic trihalo silane having the formula:

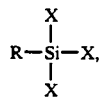

wherein R and $R_1$ are selected from the group consisting of alkenyl and alkyl radicals having 1 to 18 carbon atoms, $R_2$ and $R_3$ are alkyl radicals having 1 to 7 carbon atoms, and X is a halogen, with a tetraalkyl titanium salt of aliphatic alcohols having 1 to 10 carbon atoms and 1 to 2 hydroxyl groups, the volume ratio of the quaternary ammonium compound to the copolymer being 0.005 to 0.5, preferably, 0.01 to 0.1.

In a preferred embodiment, suitable dialiphatic dialkoxy silanes include dimethyl diethoxy silane, diethyl diethoxy silane, dimethyl dimethoxy silane, diethyl diethoxy silane, dimethyl dimethoxy silane, diethyl dimethoxy silane, dibutyl dimethoxy silane, dibutyl diethoxy silane, dibutyl dibutoxy silane, and methyl vinyl diethoxy silane. In another preferred embodiment, suitable monoaliphatic trihalo silanes and dialiphatic dihalo silanes include monoethyl trichloro silane, monomethyl trichloro silane, dimethyl dichloro silane, diethy dichloro silane, dipropyl dibromo silane, and dibutyl diiodo silane. In a further exemplary embodiment, suitable tetraalkyl titanates include tetraisopropyl titanate, tetrabutyl titanate, partially polymerized tetrabutyl titanate, tetra-2-ethylhexyl titanate, and tetraoctylene glycol titanate.

In another embodiment, suitable cationic, surface-active quaternary ammonium compounds include aliphatic trimethyl ammonium halides wherein the aliphatic radical has 8 to 22 carbon atoms; these compounds in a preferred embodiment include dodecyl trimethyl ammonium chloride, hexadecyltrimethyl ammonium chloride, and octadecyl trimethyl ammonium chloride. In a further preferred embodiment, the quaternary ammonium compounds include dialiphatic dimethyl ammonium halides wherein the aliphatic radicals have 8 to 22 carbon atoms; these compounds in a preferred embodiment include dicoco dimethyl ammonium chloride in which the alky groups are essentially dodecyl, dioctadecyl dimethyl ammonium chloride, and mixtures of aliphatic trimethyl and dialiphatic dimethyl ammonium halides in which the aliphatic groups are octyl, decyl, dodecyl, tetradecyl, hexadecyl, octadecyl, octadecenyl and octadecadienyl. In a further embodiment the quarternary ammonium compounds include quaternized heterocyclic tertiary amines having an aliphatic radical of 8 to 22 carbon atoms. These compounds in a preferred embodiment include (i) cetyl pyridinium chloride, (ii) aliphatic aryl dimethyl ammonium halides where the aliphatic radical has 8 to 22 carbon atoms such as stearyl dimethylbenzyl ammonium chloride, and (iii) aliphatic alkoxy aryl ammonium halides such as diisobuylcresoxyethoxethyl dimethylbenzyl ammonium chloride.

The hydrolysis of dialiphatic dialkoxy silanes can be accomplished by strong mineral or organic acids, such as hydrochloric acid, sulfuric acid, or p-toluene sulfonic acid. The hydrolysis product is then reacted with tetraalkyl titanate by refluxing at temperatures from 100 degrees Centigrade to 200 degrees Centigrade to form the silico-titanium copolymer.

The water repellant compound can be applied to transparent surfaces, such as glass and acrylic, in any convenient fashion. The compounds can be applied by wiping the transparent surface to be coated with the compound, or by spraying the compound by itself or in solution with an organic solvent such as hydrocarbons with a spray gun or atomizer. In a preferred embodiment, the compound is sprayed from an aerosol container in which the compound has been previously mixed with a fluorinated hydrocarbon propellant. In a preferred embodiment, the fluorinated hydrocarbon propellant is Freon.

The preferred additive provides an identifiable odor, is nontoxic, has a minimum surface tension of about twenty five dynes per centimeter, is essentially miscible with Freon 113, and has an index of refraction between about 1.47 and 1.54. By the term "identifiable odor" it is meant that a person could detect the odor by smell after having read a written description of the odor. The preferred additives having these properties are limonene and methyl salicylate. More preferably, the additive is limonene, and even more preferably the additive is R-limonene. Limonene has a odor recognition threshold level of between about 50 and 70 parts per billion. This is well below the Freon recognition threshold level in air of fifty to seventy parts per million.

Preferably, the additive is between two percent and ten percent by total volume of the rain repellant compound; and more preferably the additive is 5% by total volume of the rain repellant compound. It has been found that when the volume of additive is less the 5%, optimum spreading of the compound across the windshield is not achieved. Furthermore, when the volume of additive is greater than about ten percent, the compound mist becomes capable of supporting combustion.

These additives have the required properties set forth in the Summary of the Invention. More specifically, they are good solvents and are fully miscible with the polymer and with the surfactant. Furthermore, each of the aforementioned additives has a refractive index which is very similar to the refractive index of glass. In addition, each of the additives has a low viscosity and is a good spreading agent.

In order to further describe the present invention, the following examples are provided.

EXAMPLE 1

To ten gallons of dimethyldiethoxysilane in a corrosion resistant steel, glass or glass-lined steel container, there is slowly added (with stirring) 100 cc of 96% sulfuric acid. This is mixed thoroughly and allowed to stand between eight and 24 hours. Then to this acidified dimethyldiethoxysilane there is slowly added, with thorough mixing, 5 gallons of distilled water. The resulting hydrolysis reaction is exothermic. Water is added over a period of one hours to maintain the temperature between 70 degrees F and 120 degrees F. To this mixture, there is added 2.5 gallons of sodium carbonate solution (5.1 oz/gallon of distilled water), mixed thoroughly, and allowed to stand for about fifteen minutes while the mixture separates into an upper oil phase and a lower water phase. To this solution there is added 5 gallons of hexane. This mixture is mixed thoroughly and allowed to stand until the oil and water phases separate. The lower water phase is drawn off and discarded leaving a clear solution of hydrolysis product in hexane (about ten gallons). Then the hexane solution is dried for a period between 8 and 24 hours over anhydrous magnesium sulfate. Then the hexane solution is filtered using ashless filter paper. Distillation off of the hexane, ethanol and traces of water is accomplished using a pot temperature of between 212 degrees F and 221 degrees F resulting in about 5 gallons of hydrolysis product remaining. The hydrolysis product is allowed to cool to room temperature, and 2.5 gallons of tetrabutyl titanate is added. This mixture is stirred slowly and refluxed for two hours at a pot temperature of 221 degrees F plus or minus 2 degrees F, resulting in a clear yellow liquid copolymer of about 7.5 gallons. The resulting liquid is cooled and transferred to a clean container.

EXAMPLE 2

To the liquid copolymer from Example 1, Valclene #1 solvent is added and mixed in a corrosion resistant steel, chromium, tin, glass, or polyethylene container, so that the percent by volume of copolymer is 8.1 and the percent by volume of solvent is 91.9. This product has been sold as prior art rain repellant under the name Rainboe, a registered trademark of The Boeing Company. Valclene, a trademark of Du Pont de Nemours, E.I. & Co., is a clear fluorocarbon formulation used as a dry cleaning fluid. Valclene is sold by Caled-Signal Division of Anscott Chemical Ind. of Wayne, N.J. and is a mixture trichlorotrifluoroethane sold under the name Freon, a registered trademark of DuPont de nemours, E.I. & Co. and Avitex ML, a trademark of Du Pont de Nemo & Co. It is believed the percent by volume of Avitex ML to Freon is between about 0.1% and 0.2%. Avitex ML, according to a Material Safety Data Sheet E 78816 dated October 10, 1985, is a trade secret of Du Pont. It is a quarternary alkyl amine salt having a boiling point of 100 degrees C, a melting point of 0 degrees C., a specific gravity of 0.98, a light yellow/light amber color, is soluble in water, and has a pH of between 4 and 5 as a 5% solution in water.

EXAMPLE #3

To 100 ml of resulting Rainboe solution from Example #2, 5 ml of 97% pure R-limonene (purchased from The Aldrich Company of Milwaukee, Wisconsin) was added and the bottle sealed. The sealed bottle then was placed in a water bath heated to 140 degrees Fahrenheit for about three months for accelerated aging purposes. Upon completion of the aging process, the improved rain repellent solution was pressurized by nitrogen to 100 psi.

EXAMPLE #4

The pressurized container containing the improved rain repellent solution from Example #3 was connected to an actual production unit airplane windshield rain repellent system in the Boeing Commercial Airplane Group Rain Tunnel. In the presence of water sprayed onto a soda lime glass specimen of the same composition as an airplane windshield, and a wind velocity equivalent to an airplane airspeed of about 120 knots, the improved rain repellent solution was sprayed onto the windshield and the results recorded by a camera. The portion of the windshield receiving the rain repellent solution was free of water and optically clear, whereas the portion of the windshield not receiving the rain repellent solution was covered by water and not optically clear.

EXAMPLE #5

A pressurized container containing the Rainboe solution from Example #2 was connected to an actual production unit airplane windshield rain repellent system in the Boeing Commercial Airplane Group Rain Tunnel. Using a wind velocity equivalent to an airplane airspeed of about 120 knots, the rain repellent solution was sprayed onto a dry windshield and the results recorded by a camera. The portion of the windshield receiving the Rainboe solution had a thick film of polymer, a large amount of optical distortion, and large amounts of reflected glare.

EXAMPLE #6

The pressurized container containing the improved rain repellent solution from Example #3 was connected to an actual production unit airplane windshield rain repellent system in the Boeing Commercial Airplane Group Rain Tunnel. Using a wind velocity equivalent to an airplane airspeed of about 120 knots, the improved solution was sprayed onto a dry windshield and the results recorded by a camera. The portion of the windshield receiving the improved rain repellent solution had a much thinner film of polymer, a smaller amount of optical distortion, and a smaller amount of reflected glare than was displayed by the windshield treated in Example #5.

EXAMPLE #7

To 100 ml of the Rainboe solution from Example #2, 5 ml of cinnamaldehyde (cinnamon) was added and the bottle containing this solution was sealed. The pressurized container containing the solution was connected to an actual production unit airplane windshield rain repellent system in the Boeing Rain Tunnel. In the presence of water sprayed onto a glass airplane windshield, the solution was sprayed onto the windshield and the results recorded by a camera. After being applied to the windshield the rain repellent solution turned into a "molasses-like" compound which distorted and severely reduced the optical qualities of the windshield.

EXAMPLE #8

To 100 ml of Rainboe solution from Example #2, 5 ml of methyl salicylate (wintergreen) was added and the bottle containing the improved rain repellant solution was sealed. This solution was aged pursuant to the procedure set forth in Example #3. A pressurized container containing the solution was connected to an actual production unit airplane windshield rain repellent system in the Boeing Rain Tunnel. In the presence of water sprayed onto a glass airplane windshield, the improved rain repellant solution was sprayed onto the windshield and the results recorded by a camera. The portion of the windshield receiving the improved rain repellant solution was free of water and optically clear, whereas the portion of the windshield not receiving the solution was wet and not optically clear.

What is claimed is:

1. A water repellent composition comprising:
   a. a silico-titanium copolymer formed by reacting (i) the hydrolysius product of a silane selected from the group consisting of dialiphatic dialkoxy silanes of the formula

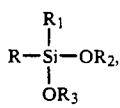

a dialiphatic dihalo silane of the formula

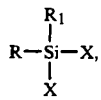

and a monoaliphatic trihalo silane of the formula

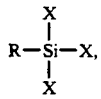

wherein R and $R_1$ are selected from the group consisting of alkenyl and alkyl radicals of 1 to 18 carbon atoms, $R_2$ and $R_3$ are alkyl radicals of 1 to 7 carbon atoms and X is a halogen, with (ii) a tetralkyl titanium salt of aliphatic alcohols of 1 to 10 carbon atoms and having 1 to 2 hydroxy groups;

b. a cationic surface-active quaternary ammonium compound, the volume ratio of cationic compound to said copolymer being 0.005 to 0.5; and c. a spreading agent selected from the group consisting of limonene and methyl salicylate.

2. The composition set forth in claim 1 wherein the spreading agent is limonene.

3. A water repellent composition comprising:

a. a silico-titanium copolymer formed from the hydrolysis product of a silane having the formula

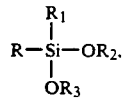

wherein R and $R_1$ are selected from the group consisting of alkenyl and alkyl radicals of 1 to 18 carbon atoms, $R_2$ and $R_3$ are alkyl radicals of 1 to 7 carbon atoms, with (ii) a tetralkyl titanium salt of aliphatic alcohols of 1 to 10 carbon atoms and having 1 to 2 hydroxyl groups;

b. a solvent formed by reacting (i) trichlorotrifluoroethane with (ii) a quaternary alkyl amine salt which is soluble in water and which has a boiling point of one hundred degrees Centigrade, a melting point of zero degrees Centigrade, a specific gravity of 0.98, and a pH of between four and five as a five percent solution in water, the percent by volume of quarternary alkyl amine salt to trichlorotriauoroethane being between about 0.1 percent and 0.2 percent and the volume ratio of the copolymer to the solvent being about eleven to one; and c. a spreading agent selected from the group consisting of limonene and methyl silicylate.

4. The composition as set forth in claim 3 wherein the spreading agent is limonene.

* * * * *